United States Patent
Lewis (10) Patent No.: US 10,681,176 B1
(45) Date of Patent: Jun. 9, 2020

(54) GENERATING DEPLOYMENT TEMPLATES BASED ON DEPLOYMENT PIPELINES

(71) Applicant: Amazon Technologies, Inc., Seattle, WA (US)

(72) Inventor: James William Lewis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 15/439,204

(22) Filed: Feb. 22, 2017

(51) Int. Cl.
G06F 9/44 (2018.01)
H04L 29/08 (2006.01)
G06F 8/60 (2018.01)

(52) U.S. Cl.
CPC .............. H04L 67/34 (2013.01); G06F 8/60 (2013.01); H04L 67/10 (2013.01)

(58) Field of Classification Search
CPC ............ G06F 8/60; H04L 67/10; H04L 67/34
See application file for complete search history.

(56) References Cited

U.S. PATENT DOCUMENTS

2015/0278741 A1* 10/2015 Hohmann .............. G06Q 10/06 705/7.26
2016/0019096 A1* 1/2016 Winterfeldt .............. G06F 8/60 717/177
2017/0180487 A1* 6/2017 Frank .................. G06F 11/3688
2017/0371636 A1* 12/2017 Palavalli .............. G06F 9/5077

OTHER PUBLICATIONS

Micah Beck et al., Pipelining and Caching the Internet Backplane Protocol, citeseerX, 2004, retrieved online on Jan. 31, 2020, pp. 1-19. Retrieved from the Internet: <URL: http://citeseerx.ist.psu.edu/viewdoc/download?doi=10.1.1.136.6857&rep=rep1&type=pdf>. (Year: 2004).*

Amazon Webservices, AWS CodePipeline User Guide, API Version Jul. 9, 2015; http://docs.aws.amazon.com/codepipeline/latest/userguide/codepipeline-user.pdf, 192 pages.

* cited by examiner

Primary Examiner — Hanh Thi-Minh Bui
(74) Attorney, Agent, or Firm — Lowenstein Sandler LLP (57) ABSTRACT

A method of generating a deployment template based on a deployment pipeline that includes a plurality of pipeline stages to deploy a service in a plurality of deployment locations. The method may include identifying, based on the deployment pipeline, a plurality of groups of sequential pipeline stages, each group of sequential pipeline stages to be performed within a subset of the plurality of deployment locations. The method may further include identifying, based on the deployment pipeline, a plurality of stage groups, wherein each stage group references a plurality of deployment stages pertaining to a single group of sequential pipeline stages. The method may further include referencing, within the template, the plurality of stage groups.

20 Claims, 8 Drawing Sheets

Deployment template 630

```
                                    Deployment wave definition
def deployment_waves                         610
    [
        [PDX],
        [IAD, DUB],
        [SFO, SIN, SYD],
        [DCA]
    ]
    end
```

```
                                    Stage group definition 620
def stage_groups
    [
        [Alpha, Beta],
        [Gamma, Prod],
        [Gamma, Export]
    ]
    end
```

GENERATING DEPLOYMENT TEMPLATES BASED ON DEPLOYMENT PIPELINES

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding.

DETAILED DESCRIPTION

Described herein are systems and methods for generating deployment templates based on deployment pipelines.

In one embodiment, a cloud-based service may include one or more software applications, the hardware on which the applications are executed, and the supporting infrastructure including auxiliary hardware components, configuration settings, and other resources (e.g., load balancers, security certificates, health monitors). A service may be deployed in multiple locations (e.g., data centers); in each location, one or more deployment stages may be implemented. A deployment stage represents a part of the deployment process that produces, in a given deployment location, an execution environment for the service. Thus, deploying service at a new location requires creating and configuring multiple resources at that location. Furthermore, even a trivial code or configuration change may require updating multiple resources across various locations and deployment stages in which the service is deployed.

In one embodiment, a software deployment procedure may be formally defined by a deployment pipeline, which may then be executed by a deployment service. The deployment pipeline may define a sequence of operations to be performed for deploying software for a given service.

In one embodiment, a deployment template may be specified by a text in a certain formal language (e.g., Ruby). The template may include one or more declaration sections that may specify, e.g., deployment locations and deployment stages. The template may further include one or more resource configuration sections represented by respective procedures, which may, following the terminology accepted in certain programming languages, be referred to as "methods." A resource configuration method may accept one or more arguments that identify the resource and specify one or more execution environments (e.g., identified by the locations and deployment stages), and may return the configuration of the identified resource in the specified execution environments.

Executing the template may produce an application definition. Being represented by a text in a certain formal language (e.g., JSON), the application definition may include descriptions of the resources, across the specified execution environments, that collectively provide execution of the service. In one embodiment, the application definition may be fed to a collection of service drivers, such that each driver is responsible for provisioning and configuration of a certain type of resource.

Creating a deployment template may be time-consuming and prone to errors. Embodiments described herein represent improvements over various common methods of creating deployment templates, by providing a method that generates a deployment template by analyzing an existing deployment pipeline. In particular, the embodiments described herein analyze an existing deployment pipeline to produce a set of vectors specifying the sequence of creating the execution environments for a given service.

Figure 1:
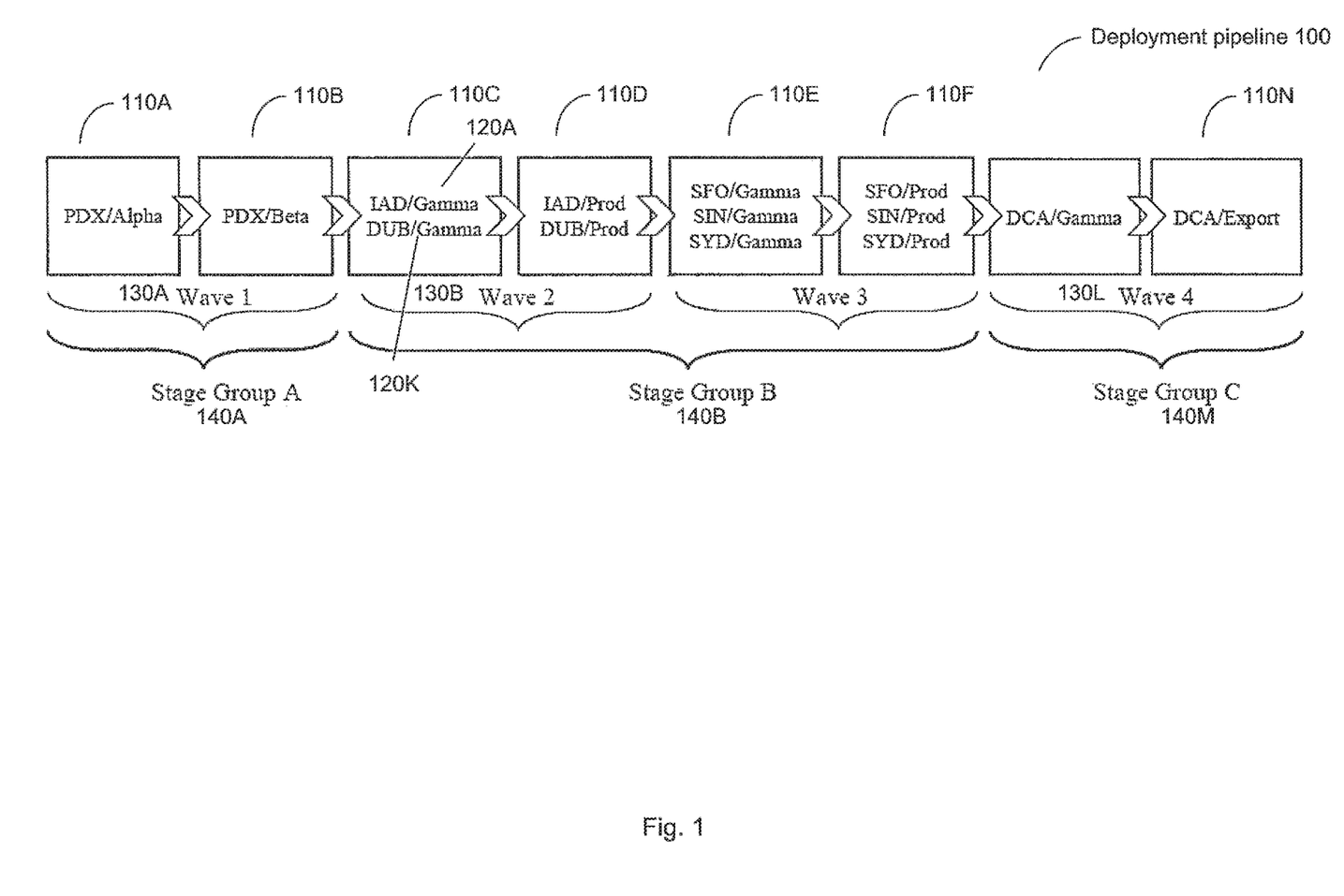
FIG. 1 schematically illustrates an example deployment pipeline, in accordance with one embodiment.

As schematically illustrated by FIG. 1 and described in more detail herein below, an example deployment pipeline 100 may include a sequence of pipeline stages 110A-110N. A pipeline stage, such as a pipeline stage 110C, represents one or more execution environments 120A-120K that may be deployed concurrently. An execution environment 120 may be identified by a location and a corresponding deployment stage. In one embodiment, a pipeline analyzer component may analyze the pipeline 100 to produce definitions of deployment waves 130A-130L and stage groups 140A-140M that specify the sequence of creating the execution environments for a given service. A deployment wave represents a group of pipeline stages to be sequentially performed in the same one or more deployment locations, while a stage group represents one or more deployment stages pertaining to a given deployment wave. The pipeline analyzer may utilize the identified vectors of the deployment waves and stage groups to generate a pipeline template based on the deployment pipeline, as described in more detail herein below.

The systems and methods described herein may be implemented by hardware (e.g., general purpose or specialized processing devices, or other devices and associated circuitry), software (e.g., instructions executable by a processing device), or a combination thereof. Various aspects of the above referenced methods and systems are described in details herein below by way of example, rather than by way of limitation.

Figure 2:
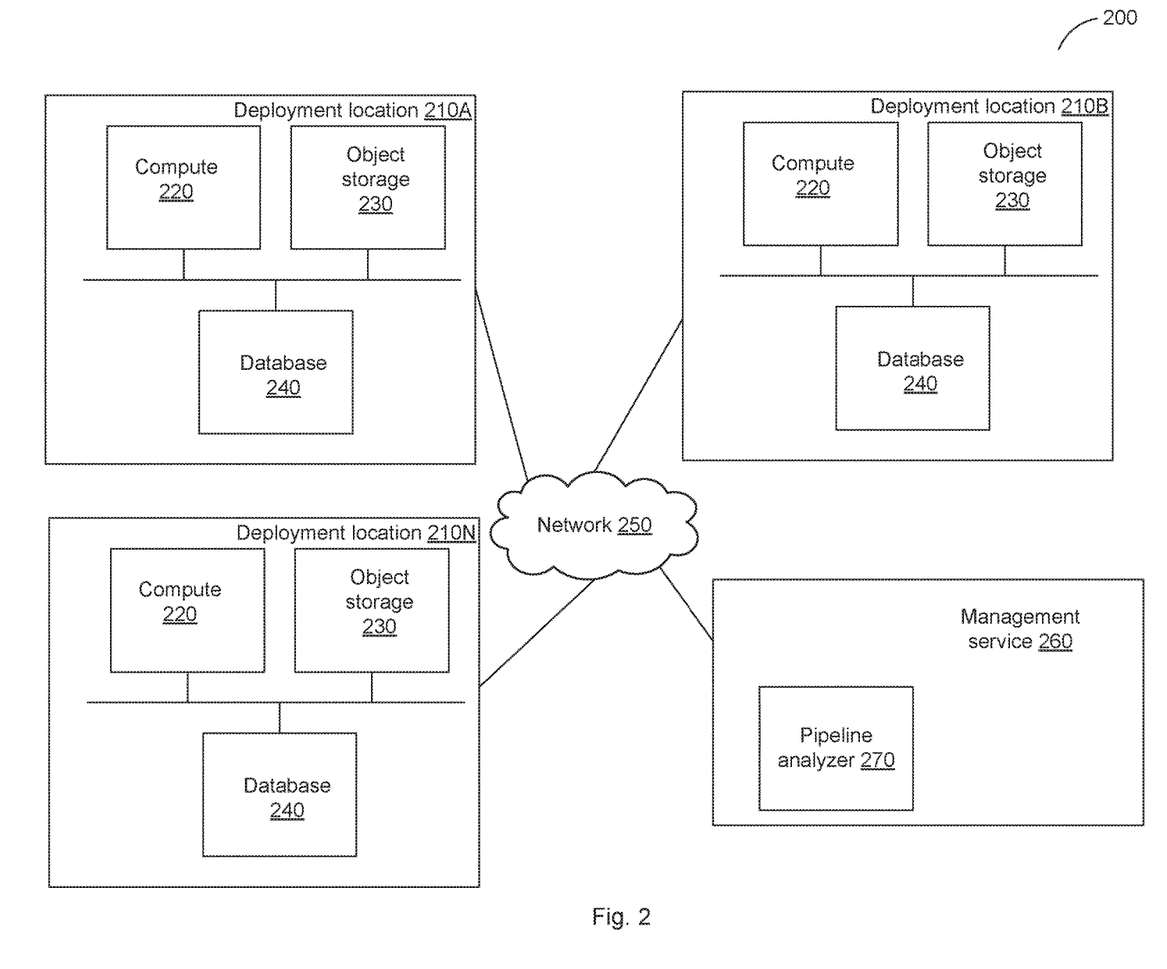
FIG. 2 schematically illustrates an example distributed computer system in which systems and methods described herein may operate in one embodiment.

FIG. 2 schematically illustrates one embodiment of a distributed computer system 200, in which systems and methods described herein may operate. As shown in FIG. 2, the distributed computer system 200 may include one or more deployment locations 210A-210N. Each deployment location may host a cloud infrastructure including a compute service 220, an object storage service 230, a database service 240, as well as various other services that are omitted from FIG. 2 for clarity and conciseness. While FIG. 2 illustrates each of the above listed services running on a dedicated hardware server, in certain implementations, two or more services may be collocated on a single hardware server. Servers executing the above listed services may be interconnected by one or more networks 250, including one or more local area networks, one or more wide area networks, or any combination thereof.

In various illustrative examples, the compute service 220 may provide scalable computing capacity, e.g., in the form of virtual machine instances or containers. The object storage service 230 may implement a scalable object storage system with a web service interface. The database service 240 may implement a relational database supporting structured query language (SQL) interface. These and other services may have configurable high-availability, auto-scaling and other operational features.

The above-referenced and other services may be managed by the cloud management service 260 which, among other functions, may perform resource provisioning and configuration. Thus, among other functional components, the cloud management service 260 may include a pipeline analyzer component 270 that may implement the methods and systems described herein.

In one embodiment, the pipeline analyzer 270 may analyze the pipeline 100 to produce definitions of deployment waves and stage groups that specify the sequence of creating the execution environments for a given service. A deployment wave represents a group of pipeline stages to be sequentially performed in the same deployment location, while a stage group represents one or more deployment stages pertaining to a given deployment wave.

In one embodiment, the pipeline analyzer may model a given pipeline using a specific notation, which is similar to algebraic expressions. Similar to the algebraic addition operation, the addition operation used by the pipeline modeling notation commutative (i.e., an addition operation is invariant with respect to the order of operands) and associative (i.e., expressions involving addition operations are invariant with respect to the order of operations). Similar to the algebraic multiplication operation, the multiplication operation used by the pipeline modeling notation commutative (i.e., a multiplication operation is invariant with respect to the order of operands), associative (i.e., expressions involving multiplication operations are invariant with respect to the order of operations), and distributive over addition (i.e., $x*(y+z)=x*y+x*z$ for any x, y, and z from the multiplication operation domain). These properties are relied upon by the pipeline analyzer for transforming the pipeline model to produce the definitions of pipeline waves and stage groups.

In one embodiment, the pipeline analyzer may represent an execution environment that is identified by a location and a corresponding deployment stage as a product (i.e., multiplication operation result) of the location and deployment stage. For example, the execution environment PDX/Alpha may be represented as (PDX*Alpha).

In one embodiment, the pipeline analyzer may represent a pipeline stage referencing one or more concurrently deployed execution environments as a group of the execution environments using the addition operation to represent the grouping. For example, the pipeline stage 110C may be represented as follows: [(IAD*Gamma)+(DUB*Gamma)].

In one embodiment, the pipeline analyzer may represent a deployment pipeline as a sequence of its stages using the addition operation to represent the grouping. For example, the deployment pipeline 100 may be represented as follows:

$$[PDX*\text{Alpha}]+[PDX*\text{Beta}]+[(IAD*\text{Gamma})+ \\ (DUB*\text{Gamma})]++[(IAD*\text{Prod})+(DUB*\text{Prod})]+ \\ [(SIN*\text{Gamma})+(SYD*\text{Gamma})++ \\ (SFO*\text{Gamma})]+[(SIN*\text{Prod})+(SYD*\text{Prod})+ \\ (SFO*\text{Prod})]++[DCA*\text{Gamma}]+[DCA*\text{Export}] \quad (1)$$

In one embodiment, the pipeline analyzer may factorize each pipeline stage by the deployment stage. The factorization operation may involve grouping, using the addition operation, the identifiers of locations that are associated with the same deployment stage. For example, [(IAD*Gamma)+(DUB*Gamma)]=[(IAD+DUB)*(Gamma)]. Thus, the expression (1) representing the deployment pipeline 100 may be transformed as follows:

$$[(PDX)*(\text{Alpha})]+[(PDX)*(\text{Beta})]+[(IAD+DUB)* \\ (\text{Gamma})]+[(IAD+DUB)**(\text{Prod})]+[(SIN+SYD+ \\ SFO)*(\text{Gamma})]+[(SIN+SYD+SFO)*(\text{Prod})]++ \\ [(DCA)*(\text{Gamma})]+[(DCA)*(\text{Export})] \quad (2)$$

In one embodiment, the pipeline analyzer may merge the terms of the algebraic expression representing sequential pipeline stages (such that each term represents a product of a sum of location identifiers and the associated deployment stage) if at least one common factor is present in the adjacent terms. The merging operation may involve grouping, using the addition operation, the identifiers of deployment stages that are associated with the same group of deployment locations. For example, [(IAD+DUB)*(Gamma)]+[(IAD+DUB)*(Prod)]=[(IAD+DUB)*(Gamma+Prod)]

The merging operations may be repeated until it is no longer possible to perform another merge. Thus, the expression (2) representing the deployment pipeline 100 may be transformed as follows:

$$[(PDX)*(\text{Alpha}+\text{Beta})]+[(IAD+DUB)*(\text{Gamma}+ \\ \text{Prod})]+[(SIN+SYD+SFO)**(\text{Gamma}+\text{Prod})]+ \\ [(DCA)*(\text{Gamma}+\text{Export})] \quad (3)$$

In one embodiment, the pipeline analyzer may then iterate the terms of the expression (3) representing the deployment pipeline to extract the factors that represent groups of deployment locations. For example, the expression [(IAD+DUB)*(Gamma+Prod)] would produce the group deployment locations (IAD+DUB).

Thus, the expression (3) representing the deployment pipeline 100 would produce the groups of deployment locations: [PDX]+[IAD+DUB)]+[SIN+SYD+SFO]+[DCA] which correspond to the deployment waves of the pipeline 100. In one embodiment, the deployment waves may be represented as a sequence of vectors in which each vector includes one or more identifiers of deployment locations associated with the respective deployment wave: (PDX), (IAD, DUB), (SIN, SYD, SFO), (DCA).

In one embodiment, the pipeline analyzer may merge any two adjacent terms (such that each term represents a product of a sum of deployment stage and the associated locations) if at least one common factor is present in the adjacent terms.

The merging operation may involve grouping, using the addition operation, the identifiers of deployment stages that are associated with the same group of deployment locations. For example, the expression [(IAD+DUB)*(Gamma+Prod)]+[(SIN+SYD+SFO)*(Gamma+Prod)] would produce [(IAD+DUB+SIN+SYD+SFO)*(Gamma+Prod)].

The merging operations may be repeated until it is no longer possible to perform another merge. Thus, the expression (3) representing the deployment pipeline 100 may be transformed as follows:

[(*PDX*)*(Alpha+Beta)]+[(*IAD+DUB+SIN+SYD+SFO*)*(Gamma+Prod)]++[(*DCA*)*(Gamma+Export)]  (4)

In one embodiment, the pipeline analyzer may then iterate over the terms of the expression (4) representing the deployment pipeline to extract the factors that represent sage groups of the deployment pipeline, such that each stage group represents one or more deployment stages pertaining to a given deployment wave. Thus, the expression (4) representing the deployment pipeline 100 would produce the following stage groups: [Alpha+Beta]+[Gamma+Prod]+[Gamma+Export] which correspond to the deployment waves of the pipeline 100. In one embodiment, the stage groups may be represented as a sequence of vectors in which each vector includes one or more identifiers of deployment stages associated with the respective deployment wave: (Alpha, Beta), (Gamma, Prod), (Gamma, Export).

Thus, the sequence of creating the execution environments by the pipeline 100 may be specified by two sets of vectors: a set of vectors defining the wave sets (PDX), (IAD, DUB), (SIN, SYD, SFO), (DCA) and a set of vectors defining the stage groups (Alpha, Beta), (Gamma, Prod), (Gamma, Export).

The pipeline analyzer may utilize the vectors defining the deployment waves and stage groups to generate a pipeline template based on the deployment pipeline, as described in more detail herein below.

Figure 3:
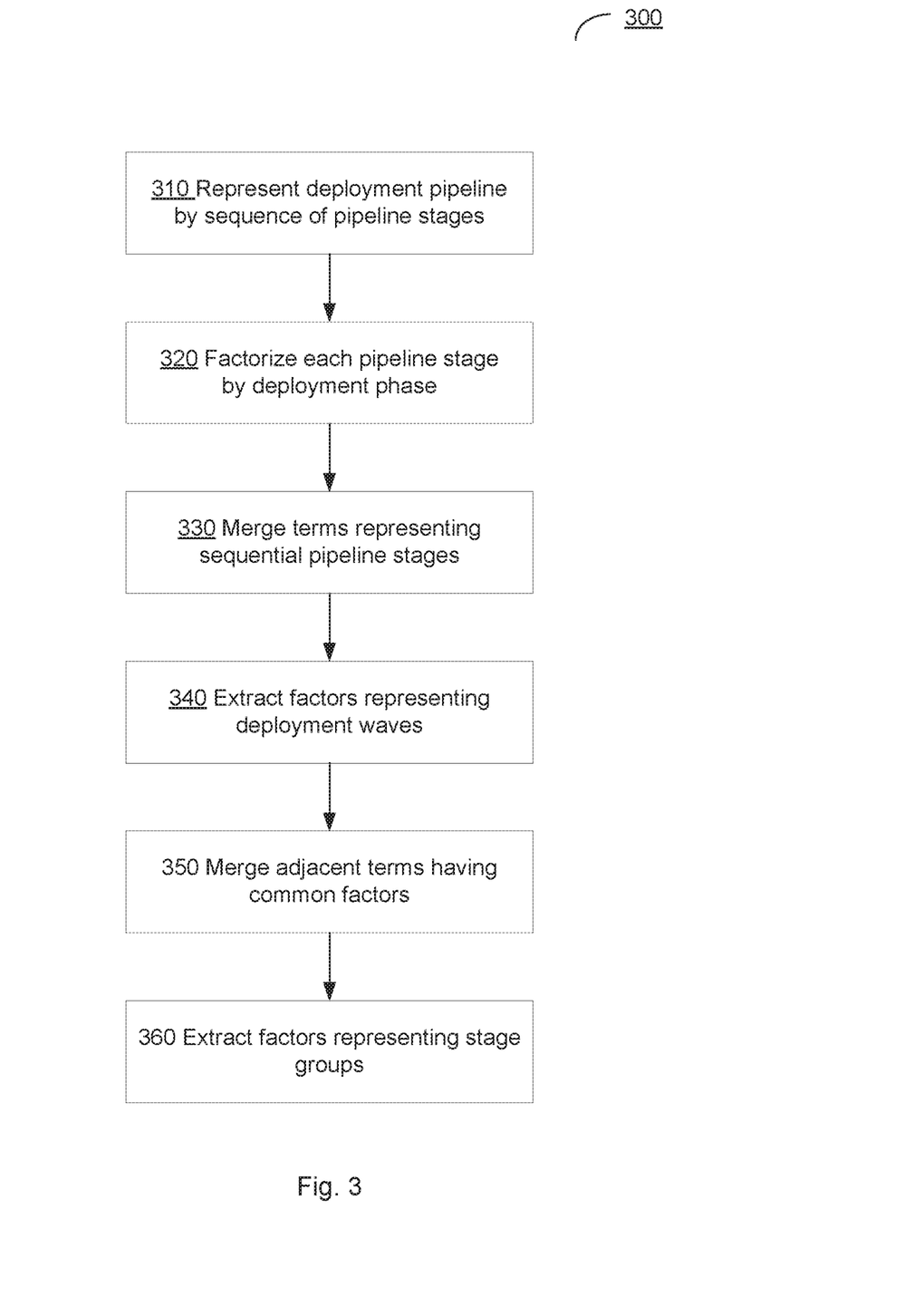
FIG. 3 is a flow diagram of one embodiment of a method of identifying deployment waves and pipeline groups of a deployment pipeline, in accordance with one embodiment.

FIG. 3 is a flow diagram of one embodiment of a method of identifying deployment waves and pipeline groups of a deployment pipeline, in accordance with one embodiment. Method 300 may be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations may be performed by one or more processors of a computer system (e.g., the computing device 800 of FIG. 8) implementing the method. In one embodiment, method 300 may be performed by a single processing thread. Alternatively, method 300 may be performed by two or more processing threads, each thread implementing one or more individual functions, routines, subroutines, or operations of the method. In one embodiment, he processing threads implementing method 300 may be synchronized (e.g., using semaphores, critical sections, or other thread synchronization mechanisms). Alternatively, the processing threads implementing method 300 may be executed asynchronously with respect to each other. Therefore, while FIG. 3 and the associated description lists the operations of method 300 in certain order, various embodiments of the method may perform at least some of the described operations in parallel or in arbitrary selected orders.

Referring to FIG. 3, at block 310, a processing device implementing the method may represent a deployment pipeline as a sequence of its stages using an algebraic expression-based notation. In particular, the pipeline analyzer may represent each pipeline stage referencing one or more concurrently deployed execution environments as a group of the execution environments using the addition operation to represent the grouping. Each execution environment that is identified by a location and a corresponding deployment stage may be represented as a product of the location and deployment stage, as described in more detail herein above.

At block 320, the processing device may factorize each pipeline stage by the deployment stage. The factorization operation may involve grouping, using the addition operation, the identifiers of locations that are associated with the same deployment stage, as described in more detail herein above.

At block 330, the processing device may merge the terms of the algebraic expression representing sequential pipeline stages (such that each term represents a product of a sum of location identifiers and the associated deployment stage) if at least one common factor is present in the adjacent terms. The merging operation may involve grouping, using the addition operation, the identifiers of deployment stages that are associated with the same group of deployment locations, as described in more detail herein above.

At block 340, the processing device may iterate over the terms of the algebraic expression representing the deployment pipeline to extract the factors that represent groups of deployment locations, such that each group defines a deployment wave of the pipeline. In one embodiment, the deployment waves may be represented as a sequence of vectors in which each vector includes one or more identifiers of deployment locations associated with the respective deployment wave, as described in more detail herein above.

At block 350, the processing device may merge adjacent terms (such that each term represents a product of a sum of deployment stage and the associated locations) if at least one common factor is present in the adjacent terms. The merging operation may involve grouping, using the addition operation, the identifiers of deployment stages that are associated with the same group of deployment locations, as described in more detail herein above.

At block 360, the processing device may iterate over the terms of the algebraic expression representing the deployment pipeline to extract the factors that represent sage groups of the deployment pipeline, such that each represents one or more deployment stages pertaining to a given deployment wave. In one embodiment, the stage groups may be represented as a sequence of vectors in which each vector includes one or more identifiers of deployment stages associated with the respective deployment wave, as described in more detail herein above.

As noted herein above, one of the operations of analyzing the pipeline involves merging the terms of the algebraic expression representing sequential pipeline stages (such that each term represents a product of a sum of location identifiers and the associated deployment stage) if at least one common factor is present in the adjacent terms. In the example described herein, the merging operation involves grouping, using the addition operation, the identifiers of deployment stages that are associated with the same group of deployment locations. However, the merging operation may fail if the sequential pipeline stages do not share a common deployment location, as shown in the example schematically illustrated by FIG. 4.

Figure 4:
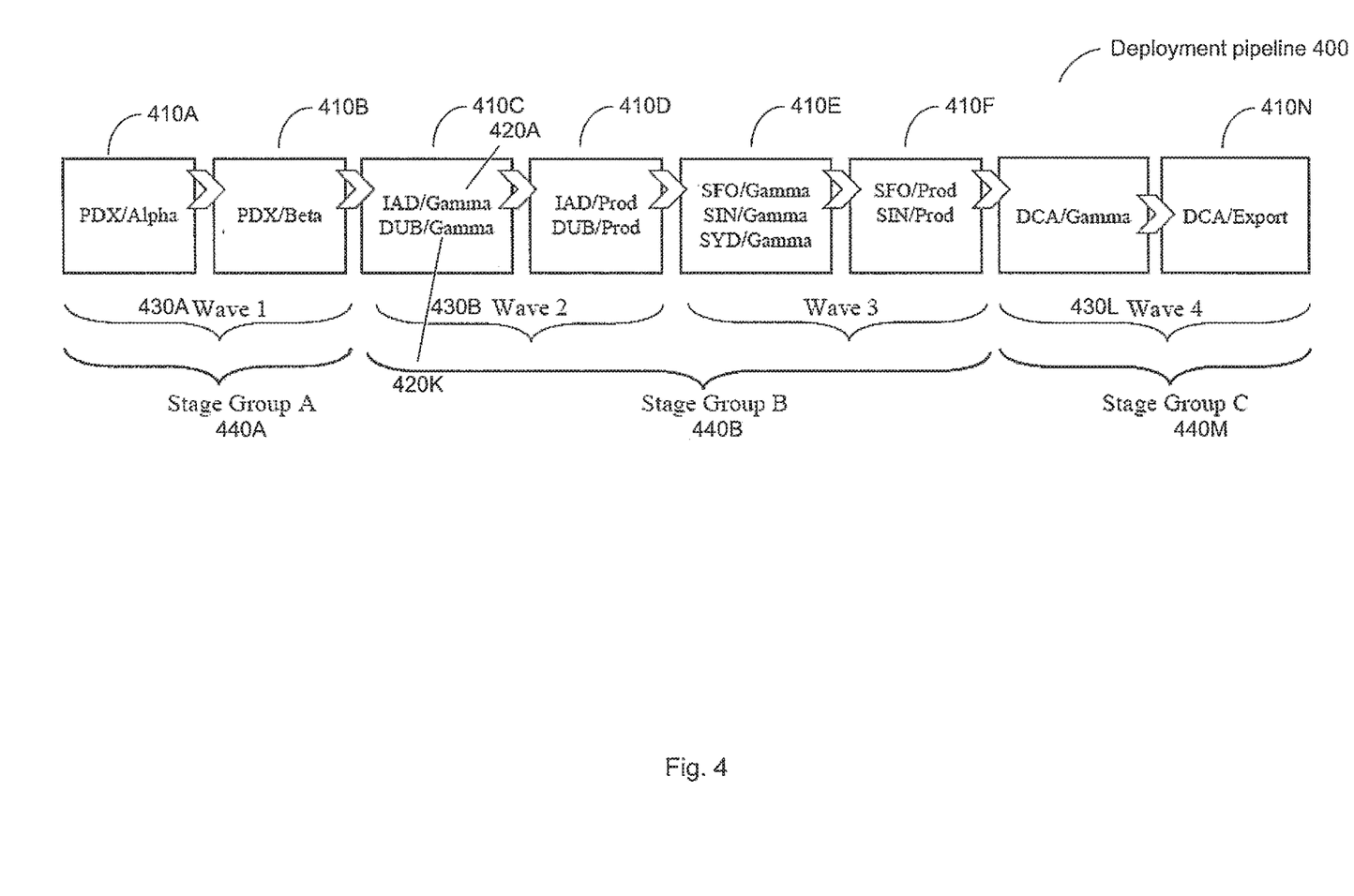
FIG. 4 schematically illustrates an example deployment pipeline, in accordance with one embodiment.

FIG. 4 schematically illustrates an example deployment pipeline 400 that includes a sequence of pipeline stages 410A-410N. A pipeline stage 410 represents one or more execution environments 420A-420K that may be deployed concurrently. An execution environment 420 may be identified by a location and a corresponding deployment stage. The example deployment pipeline 400 is similar to the example deployment pipeline 100, with the exception of pipeline stage 410F, which unlike its counterpart pipeline stage 110F lacks the deployment environment SYD/Prod.

Using the above-described notation, the deployment pipeline 400 may be represented as follows:

$$[PDX*\text{Alpha}]+[PDX*\text{Beta}]+[(IAD*\text{Gamma})+ \\ (DUB*\text{Gamma})]++[(IAD*\text{Prod})+(DUB*\text{Prod})]+ \\ [(SIN*\text{Gamma})+(SYD*\text{Gamma})++ \\ (SFO*\text{Gamma})]+[(SIN*\text{Prod})+(SFO*\text{Prod})]++ \\ [DCA*\text{Gamma}]++[DCA*\text{Export}] \quad (5)$$

In a manner similar to the example of FIG. 1, the pipeline analyzer may factorize each pipeline stage by the deployment stage. The factorization operation may involve grouping, using the addition operation, the identifiers of locations that are associated with the same deployment stage. Thus, the expression (5) representing the deployment pipeline 400 may be transformed as follows:

$$[(PDX)*(\text{Alpha})]+[(PDX)*(\text{Beta})]+[(IAD+DUB)* \\ (\text{Gamma})]+[(IAD+DUB)**(\text{Prod})]+[(SIN+SYD+ \\ SFO)*(\text{Gamma})]+[(SIN+SFO)*(\text{Prod})]++ \\ [(DCA)*(\text{Gamma})]+[(DCA)*(\text{Export})] \quad (6)$$

The pipeline analyzer may then attempt to merge the terms of the algebraic expression representing sequential pipeline stages (such that each term represents a product of a sum of location identifiers and the associated deployment stage) if at least one common factor is present in the adjacent terms. However, the merging operation may fail if the sequential pipeline stages do not share a common deployment location as is the case with the pipeline stages 410E and 410F: [(SIN+SYD+SFO)*(Gamma)]+[(SIN+SFO)*(Prod)].

In one embodiment, the pipeline analyzer may overcome certain pipeline irregularities (such as sequential pipeline stages not sharing a common deployment location) that would otherwise prevent the factorization operation to succeed, by performing noise-tolerant factorization. In one embodiment, in order to perform noise-tolerant factorization of two terms A and B that represent sequential pipeline stages, the pipeline analyzer may estimate the degree of similarity of the two terms using the following similarity criterion:

$$S(X,Y)=|X\cap Y|/\max(|X|,|Y|)*100\%, \text{ where:}$$

S(X,Y) represents the degree of similarity of sets X and Y,

X∩Y denotes the intersection (i.e., common elements) of sets X and U,

|X| denotes the cardinality (i.e., the number of elements) of set X, and max(x, y) represents a function of two arguments that returns the greater value.

In one embodiment, the pipeline analyzer may perform the factorization operation if the degree of similarity of the two terms exceeds a certain threshold value (e.g., 50%).

In the example of FIG. 4, the term A may represent the pipeline stage 410E and the term B may represent the pipeline stage 410F: A=[(SFO+SIN+SYD)*(Gamma)] and B=[(SFO+SIN)*(Prod)]. Thus, each of the terms A and B references a group of deployment locations (denoted herein as A.factors or B.factors, respectively) and a group of associated deployment stages (denoted herein below as A.product or B.product, respectively). Therefore, A.factors=(SFO+SIN+SYD), A.product=Gamma, B.factors=(SFO+SIN), and B.product=Prod.

In one embodiment, if the terms A and B are identical, the resulting factors (denoted herein as C.factors) are represented by the factors of any of the terms (e.g., C.factors=A.factors), and the resulting product is represented by the sum of products of the two terms (e.g., C.product=A.product+B.product).

In one embodiment, if one of the terms is a subset of another term (e.g., B is subset of A), the resulting factors (denoted herein as C.factors) are represented by the factors of the larger term (e.g., C.factors=A.factors), and the resulting product is represented by the sum of products of the two terms (e.g., C.product=A.product+B.product).

In one embodiment, if the two terms have at least one common element but none of the terms is a subset of another term, the resulting factors (denoted herein as C.factors) are represented by the intersection of the factors of the two terms (e.g., C.factors=A.factors n B.factors), and the resulting product is represented by the sum of products of the two terms (e.g., C.product=A.product+B.product).

In one embodiment, if the two terms have no common elements, the pipeline analyzer may abort the attempted factorization operation and throw and exception indicating an invalid combination of input terms.

Thus, the noise-tolerant factorization of the terms A=[(SFO+SIN+SYD)*(Gamma)] and B=[(SFO+SIN)*(Prod)] may produce the following expression: [(SFO+SIN+SYD)*(Gamma+Prod)].

Figure 5:
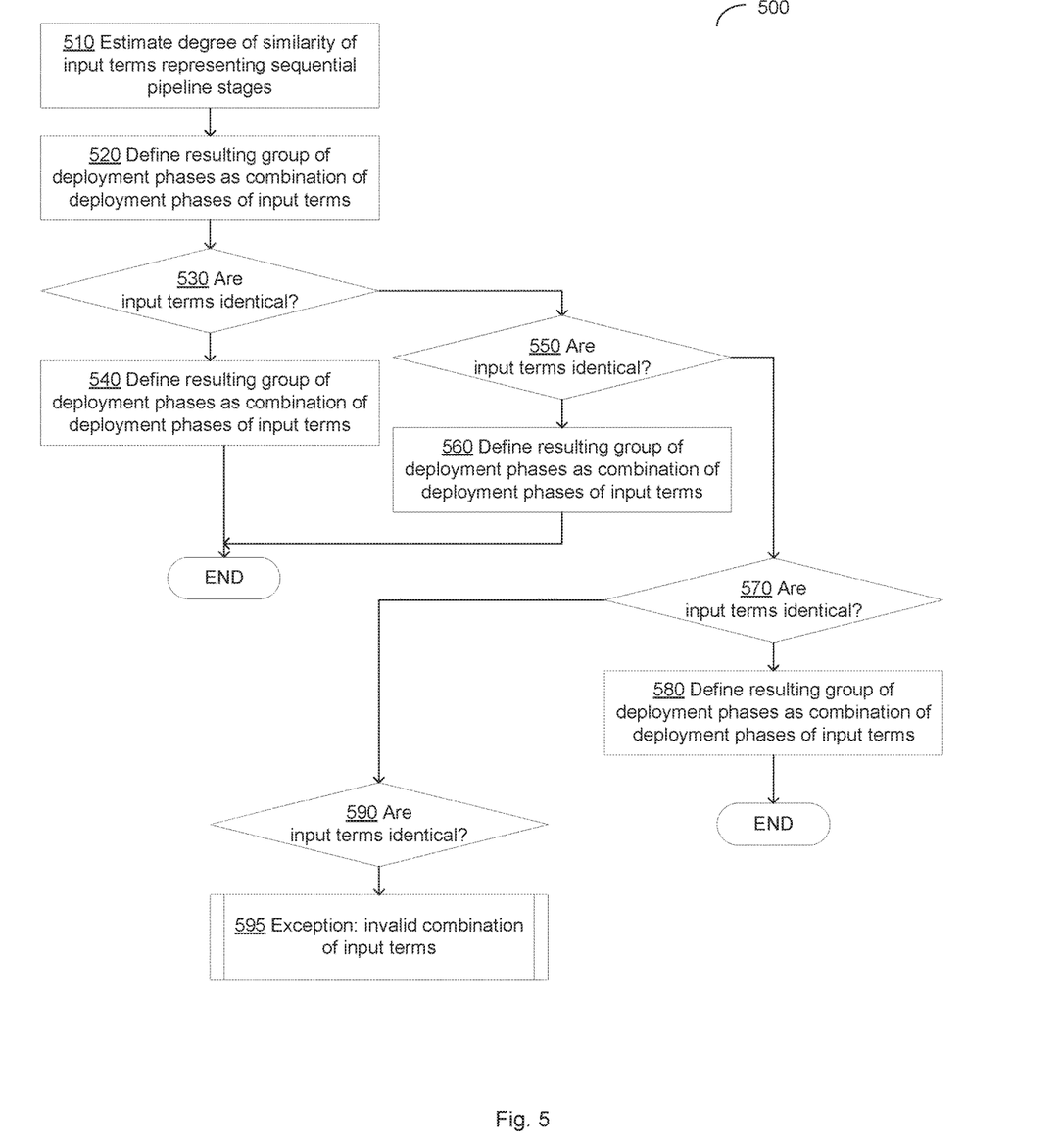
FIG. 5 is a flow diagram of one embodiment of a method of noise-tolerant factorization of algebraic expressions representing deployment pipelines, in accordance with one embodiment.

FIG. 5 is a flow diagram of one embodiment of a method of noise-tolerant factorization of algebraic expressions representing deployment pipelines, in accordance with one embodiment. Method 500 may be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations may be performed by one or more processors of a computer system (e.g., the computing device 800 of FIG. 8) implementing the method. In one embodiment, method 500 may be performed by a single processing thread. Alternatively, method 500 may be performed by two or more processing threads, each thread implementing one or more individual functions, routines, subroutines, or operations of the method. In one embodiment, he processing threads implementing method 500 may be synchronized (e.g., using semaphores, critical sections, or other thread synchronization mechanisms). Alternatively, the processing threads implementing method 500 may be executed asynchronously with respect to each other. Therefore, while FIG. 5 and the associated description lists the operations of method 500 in certain order, various embodiments of the method may perform at least some of the described operations in parallel or in arbitrary selected orders.

Referring to FIG. 5, at block 510, a processing device implementing the method may estimate the degree of similarity of two input terms that represent sequential pipeline stages. Each input term may be represented by group of deployment location identifiers and a group of deployment stage identifiers.

Responsive to determining that the degree of similarity exceeds a certain threshold value, the processing may continue at block 520; otherwise, the method may terminate.

At block 520, the processing device may define the resulting group of deployment stages as a combination of the deployment stages of the input terms.

Responsive to determining, at block 530, that the input terms are identical, the processing device may, at block 540, define the resulting group of location identifiers as being equal to a group of location identifiers of any of the input terms.

Responsive to determining, at block 550, that one of the input terms is a subset of another term, the processing device may, at block 560, define the resulting group of location identifiers as being equal to the group of location identifiers of the input term that includes the other input term.

Responsive to determining, at block 570, that the input terms have at least one common element but none of the terms is a subset of another term, the processing device may, at block 580, define the resulting group of location identifiers as being represented by the common elements of the groups of location identifiers of the input terms.

Responsive to determining, at block 590, that the input terms have no common elements, the processing device may, at block 595, abort the attempted factorization operation and throw and exception indicating an invalid combination of input terms.

Figure 6:
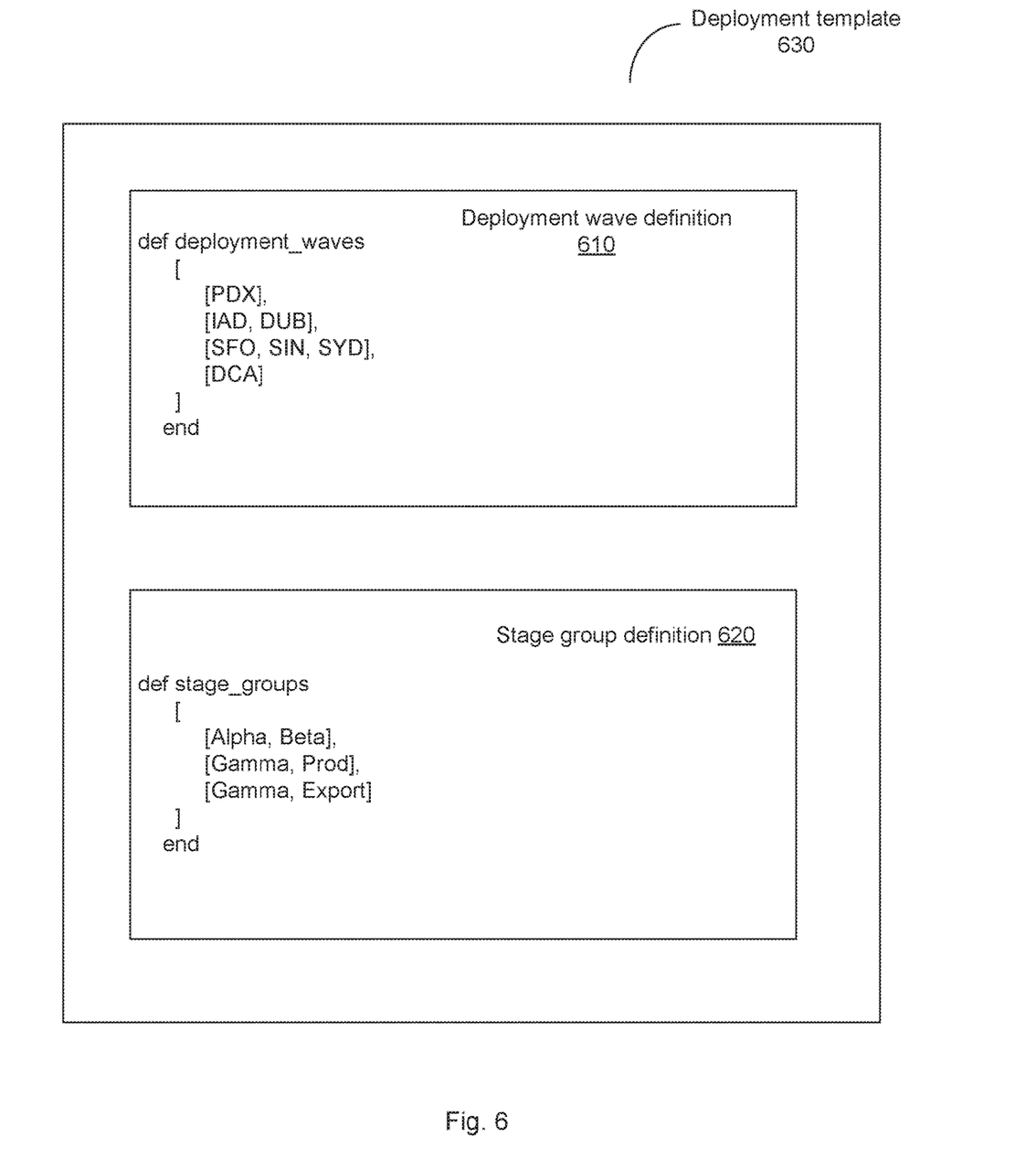
FIG. 6 schematically illustrates a deployment template including definitions of deployment waves and stage groups, in accordance with one embodiment.

As noted herein above, the pipeline analyzer may utilize the identified vectors of the deployment waves and stage groups to generate a pipeline template based on the deployment pipeline. As schematically illustrated by FIG. 6, in one embodiment, the pipeline analyzer may insert the definitions of the deployment waves 610 and/or stage groups 620 into corresponding declaration sections of the deployment template 630 being generated. The declaration sections 610, 620 may override corresponding sections of a standard template that may be utilized as the starting point for template generation. In one embodiment, the pipeline analyzer may further insert the definitions of the deployment waves and/or stage groups into the template methods that define resource configuration procedures. As noted herein above, a resource configuration method may accept one or more arguments that identify the resource and specify one or more execution environments (e.g., identified by the locations and deployment stages), and may return the configuration of the identified resource in the specified execution environments. The method definitions produced by the template analyzer may override corresponding abstract methods of a standard template.

Figure 7:
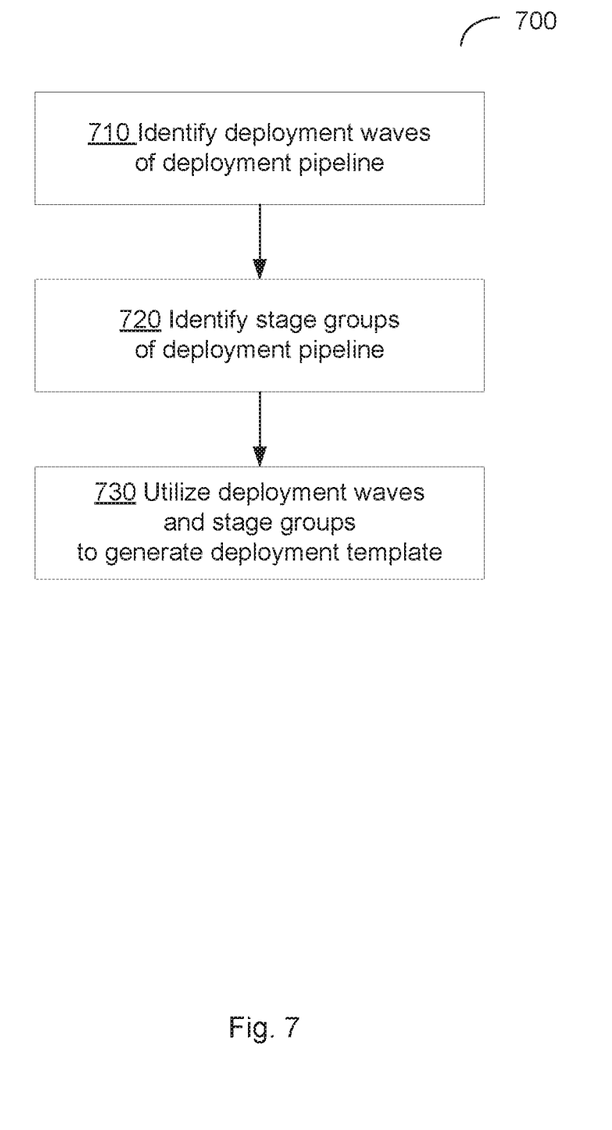
FIG. 7 is a flow diagram of one embodiment of a method of generating a deployment template based on a deployment pipeline, in accordance with one embodiment.

FIG. 7 is a flow diagram of one embodiment of a method of generating a deployment template based on a deployment pipeline, in accordance with one embodiment. Method 700 may be performed by processing logic that includes hardware (e.g., circuitry, dedicated logic, programmable logic, microcode, etc.), software (e.g., instructions run on a processor to perform hardware simulation), or a combination thereof. Method 700 or each of its individual functions, routines, subroutines, or operations may be performed by one or more processors of a computer system (e.g., the computing device 800 of FIG. 8) implementing the method. In one embodiment, method 700 may be performed by a single processing thread. Alternatively, method 700 may be performed by two or more processing threads, each thread implementing one or more individual functions, routines, subroutines, or operations of the method. In one embodiment, he processing threads implementing method 700 may be synchronized (e.g., using semaphores, critical sections, or other thread synchronization mechanisms). Alternatively, the processing threads implementing method 700 may be executed asynchronously with respect to each other. Therefore, while FIG. 7 and the associated description lists the operations of method 700 in certain order, various embodiments of the method may perform at least some of the described operations in parallel or in arbitrary selected orders.

Referring to FIG. 7, at block 710, a processing device implementing the method may identify one or more deployment waves of the deployment pipeline. Each deployment wave may be represented by a group of sequential pipeline stages, such that each group is performed within the same deployment location or a group of deployment locations. In one embodiment, the processing device may represent each pipeline stage referencing one or more concurrently deployed execution environments as a group of the execution environments using the addition operation to represent the grouping. Each execution environment that is identified by a location and a corresponding deployment stage may be represented as a product of the location and deployment stage. The processing device may factorize each pipeline stage by the deployment stage. The factorization operation may involve grouping, using the addition operation, the identifiers of locations that are associated with the same deployment stage. The processing device may merge the terms of the algebraic expression representing sequential pipeline stages (such that each term represents a product of a sum of location identifiers and the associated deployment stage) if at least one common factor is present in the adjacent terms. The merging operation may involve grouping, using the addition operation, the identifiers of deployment stages that are associated with the same group of deployment locations. The processing device may iterate over the terms of the algebraic expression representing the deployment pipeline to extract the factors that represent groups of deployment locations, such that each group defines a deployment wave of the pipeline, as describe in more detail herein above.

At block 720, the processing device may identify one or more stage groups of the deployment pipeline. Each stage group may reference a plurality of deployment stages pertaining to a single group of sequential pipeline stages. In one embodiment, in order to identify the stage groups, the processing device may merge adjacent terms of the algebraic expression representing the deployment pipeline (such that each term represents a product of a sum of deployment stage and the associated locations) if at least one common factor is present in the adjacent terms. The merging operation may involve grouping, using the addition operation, the identifiers of deployment stages that are associated with the same group of deployment locations. The processing device may then iterate over the terms of the algebraic expression representing the deployment pipeline to extract the factors that represent sage groups of the deployment pipeline, such that each stage group represents one or more deployment stages pertaining to a given deployment wave. In one embodiment, the stage groups may be represented as a sequence of vectors in which each vector includes one or more identifiers of deployment stages associated with the respective deployment wave, as described in more detail herein above.

At block 730, the processing device may utilize the identified deployment waves and stage groups for generating a deployment template, as described in more detail herein above.

Figure 8:
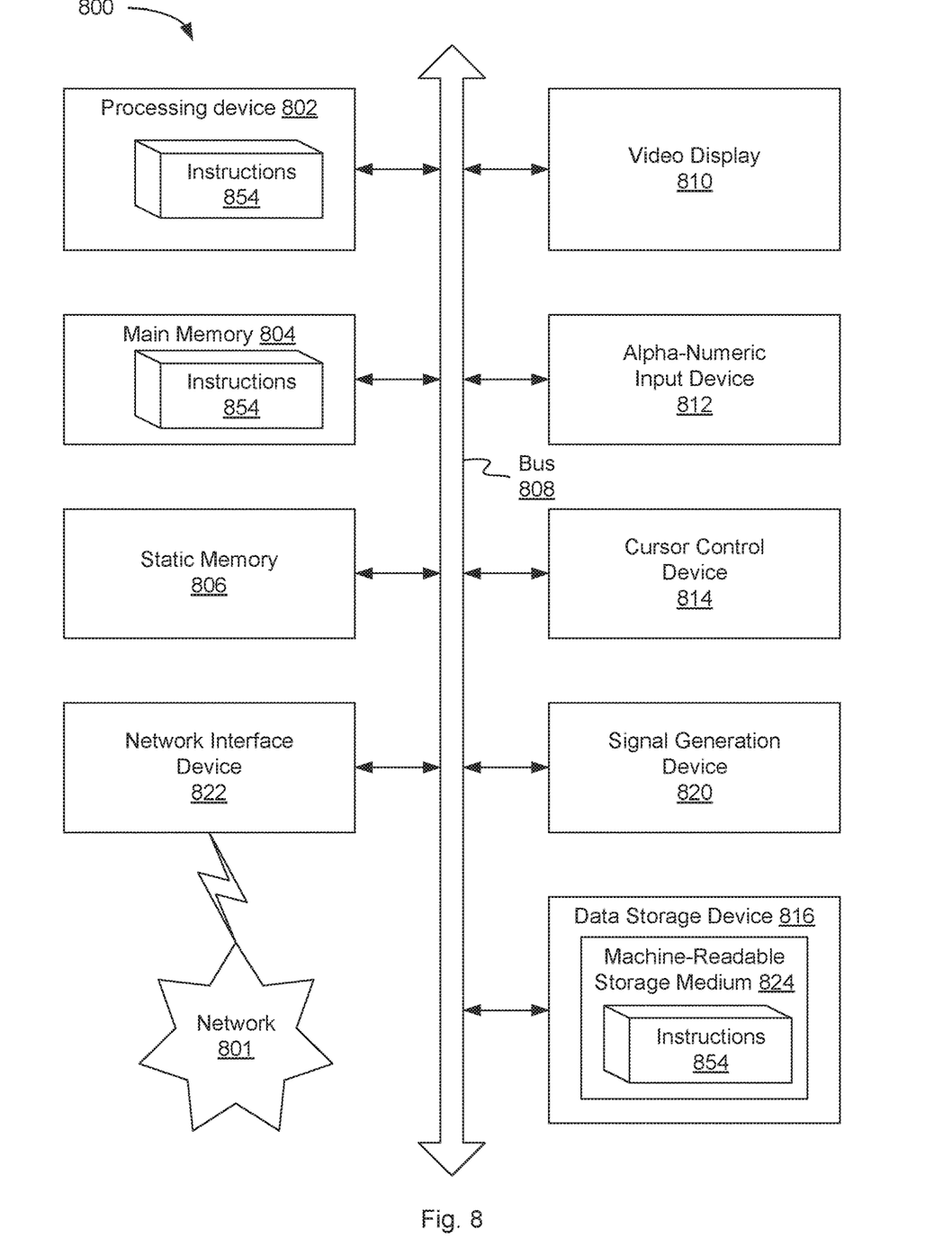
FIG. 8 illustrates a diagrammatic representation of a machine in the exemplary form of a computer system within which a set of instructions, for causing the machine to perform any one or more of the methods discussed herein, may be executed in one embodiment.

FIG. 8 illustrates a diagrammatic representation of a machine in the exemplary form of a computer system within which a set of instructions, for causing the machine to perform any one or more of the methods discussed herein, may be executed in one embodiment. A set of instructions for causing the computing device 800 to perform any one or more of the methods discussed herein may be executed by the computing device 800. In one embodiment, the computing device 800 may implement the functions of the pipeline analyzer 270.

In one embodiment, the computing device 800 may be connected to other computing devices by a network 801 provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computing device" shall also be taken to include any collection of machines (e.g., computers) that individually or jointly execute a set (or multiple sets) of instructions to perform any one or more of the methodologies discussed herein.

In one embodiment, the computing device 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.) and a data storage device 818, which communicate with each other via a bus 808.

In one embodiment, the processing device 802 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 802 may therefore include multiple processors. The processing device 802 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor or the like.

In one embodiment, the computing device 800 may further include one or more network interface devices 822. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker).

In one embodiment, the data storage device 818 may include a computer-readable storage medium 824 on which is stored one or more sets of instructions 854 embodying any one or more of the methods or functions described herein. The instructions 854 may also reside, completely or at least partially, within the main memory 804 and/or within the processing device 802 during execution thereof by the computing device 800; the main memory 804 and the processing device 802 also constituting machine-readable storage media.

While the computer-readable storage medium 824 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

The preceding description sets forth numerous specific details such as examples of specific systems, components, methods and so forth, in order to provide a good understanding of various embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In the above description, numerous details are set forth. It will be apparent, however, to one of ordinary skill in the art having the benefit of this disclosure, that certain embodiments described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. These signals may include bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, passages utilizing terms such as "determining", "identifying", "adding", "selecting" or the like, describe the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations described herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
    receiving a deployment pipeline defining a procedure for deploying a cloud service in a plurality of deployment locations, wherein the deployment pipeline comprises a sequence of pipeline stages, each pipeline stage specifying a deployment stage to be performed in a first subset of the plurality of deployment locations;
    identifying, based on the deployment pipeline, a plurality of deployment waves, wherein each deployment wave comprises a group of sequential pipeline stages to be performed in a second subset of the plurality of deployment locations;
    identifying, based on the deployment pipeline, a plurality of stage groups, wherein each stage group references a plurality of deployment stages pertaining to a single deployment wave of the plurality of deployment waves; and
    generating a deployment template referencing the plurality of deployment waves and the plurality of stage groups.

2. The method of claim 1, wherein generating the deployment template further comprises:
    inserting a definition of at least one of: a deployment wave of the plurality of deployment waves or a stage group of the plurality of stage groups into the deployment template.

3. The method of claim 1, wherein generating the deployment template further comprises:
    overriding, using a definition of at least one of: a deployment wave of the plurality of deployment waves or a stage group of the plurality of stage groups, a declaration section of a standard template.

4. The method of claim 1, wherein generating the deployment template further comprises:
    overriding, using a definition of at least one of: a deployment wave of the plurality of deployment waves or a stage group of the plurality of stage groups, a method definition of a standard template.

5. The method of claim 1, wherein generating the deployment template further comprises:
    representing the deployment pipeline as a sequence of pipeline stages using an algebraic notation.

6. The method of claim 1, wherein generating the deployment template further comprises:
    represent a pipeline stage of the plurality of pipeline stages as a sum of execution environments referenced by the pipeline stage.

7. A computer system, comprising:
    a memory; and
    a processing device operatively coupled to the memory, the processing device to:
        receive a definition of a deployment pipeline including a plurality of pipeline stages, each pipeline stage specifying a deployment stage to be performed for deploying a service in a first subset of a plurality of deployment locations;
        identify, based on the deployment pipeline, a plurality of groups of sequential pipeline stages, each group of sequential pipeline stages representing a deployment wave to be performed in a second subset of the plurality of deployment locations;
        identify, based on the deployment pipeline, a plurality of stage groups, wherein each stage group references a plurality of deployment stages pertaining to a single group of sequential pipeline stages; and
        generate a deployment template referencing the plurality of deployment waves and the plurality of stage groups.

8. The computer system of claim 7, wherein to identify the plurality of stage groups, the processing device is further to:
    group identifiers of deployment stages that are associated with a same subset of the plurality of deployment locations.

9. The computer system of claim 7, wherein to generate the deployment template, the processing device is further to:
    represent the deployment pipeline as a sequence of pipeline stages using an algebraic notation.

10. The computer system of claim 9, wherein to represent the deployment pipeline as a sequence of pipeline stages, the processing device is further to:
    represent a pipeline stage of the sequence of pipeline stages as a sum of execution environments referenced by the pipeline stage.

11. The computer system of claim 9, wherein to represent the deployment pipeline as a sequence of pipeline stages, the processing device is further to:
    represent an execution environment identified by a location and a deployment stage as a product of the location and deployment stage.

12. The computer system of claim 7, wherein to identify the plurality of groups of sequential pipeline stages, the processing device is further to:
    group identifiers of deployment locations that are associated with a same deployment stage.

13. The computer system of claim 7, wherein to identify the plurality of groups of sequential pipeline stages, the processing device is further to:
    determine whether at least one common factor is present in terms of an algebraic expression representing sequential pipeline stages; and
    merge the terms of the algebraic expression.

14. The computer system of claim 7, wherein to identify the plurality of groups of sequential pipeline stages, the processing device is further to:
  determine whether a degree of similarity of terms of an algebraic expression representing sequential pipeline stages exceeds a threshold value; and
  merge the terms of the algebraic expression.

15. A non-transitory computer-readable storage medium comprising executable instructions that, when executed by a processing device, cause the processing device to:
  receive a definition of a deployment pipeline including a plurality of pipeline stages, each pipeline stage specifying a deployment stage to be performed for deploying a service in a first subset of a plurality of deployment locations;
  identify, based on the deployment pipeline, a plurality of groups of sequential pipeline stages, each group of sequential pipeline stages representing a deployment wave to be performed within a second subset of the plurality of deployment locations;
  identify, based on the deployment pipeline, a plurality of stage groups, wherein each stage group references a plurality of deployment stages pertaining to a single group of sequential pipeline stages; and
  generate a deployment template referencing the plurality of deployment waves and the plurality of stage groups.

16. The non-transitory computer-readable storage medium of claim 15, further comprising executable instructions to cause the processing device to:
  represent the deployment pipeline as a sequence of pipeline stages using an algebraic notation.

17. The non-transitory computer-readable storage medium of claim 15, further comprising executable instructions to cause the processing device to:
  determine whether at least one common factor is present in terms of an algebraic expression representing sequential pipeline stages; and
  merge the terms of the algebraic expression.

18. The non-transitory computer-readable storage medium of claim 15, further comprising executable instructions to cause the processing device to:
  determine whether a degree of similarity of terms of an algebraic expression representing sequential pipeline stages exceeds a threshold value; and
  merge the terms of the algebraic expression.

19. The non-transitory computer-readable storage medium of claim 15, further comprising executable instructions to cause the processing device to:
  override, using a definition of a stage group of the plurality of stage groups, at least one of: a declaration section of a standard template or a method definition of the standard template.

20. The non-transitory computer-readable storage medium of claim 15, further comprising executable instructions to cause the processing device to:
  override, using a definition of a deployment wave of the plurality of deployment waves, at least one of: a declaration section of a standard template or a method definition of the standard template.

* * * * *